US009240083B2

(12) United States Patent
Isom et al.

(10) Patent No.: US 9,240,083 B2
(45) Date of Patent: Jan. 19, 2016

(54) ROTOR SYSTEM HEALTH MONITORING USING SHAFT LOAD MEASUREMENTS AND VIRTUAL MONITORING OF LOADS

(75) Inventors: Joshua D. Isom, South Windsor, CT (US); Brian Edward Morris, Shelton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1607 days.

(21) Appl. No.: 12/714,527

(22) Filed: Feb. 28, 2010

(65) Prior Publication Data

US 2010/0219987 A1 Sep. 2, 2010

Related U.S. Application Data

(60) Provisional application No. 61/156,815, filed on Mar. 2, 2009.

(51) Int. Cl.

| | |
|---|---|
| ***G08B 21/00*** | (2006.01) |
| ***G08B 23/00*** | (2006.01) |
| ***G01M 9/00*** | (2006.01) |
| ***G01L 1/00*** | (2006.01) |
| ***G01F 17/00*** | (2006.01) |
| ***G07C 5/08*** | (2006.01) |

(52) U.S. Cl.
CPC .................................... *G07C 5/0816* (2013.01)

(58) Field of Classification Search
USPC ....................................... 706/17; 702/36, 182
See application file for complete search history.

(56) References Cited

U.S. PATENT DOCUMENTS

| | | | | |
|---|---|---|---|---|
| 4,480,480 | A | 11/1984 | Scott et al. | |
| 4,575,718 | A * | 3/1986 | Ludowyk | 340/3.71 |
| 4,751,657 | A * | 6/1988 | Imam et al. | 702/35 |
| 5,381,692 | A | 1/1995 | Winslow et al. | |
| 5,633,800 | A | 5/1997 | Bankert et al. | |
| 5,751,609 | A | 5/1998 | Schaefer, Jr. et al. | |
| 5,890,101 | A | 3/1999 | Schaefer, Jr. et al. | |
| 5,901,272 | A * | 5/1999 | Schaefer et al. | 706/17 |
| 6,006,163 | A * | 12/1999 | Lichtenwalner et al. | 702/36 |
| 6,014,896 | A | 1/2000 | Schoess | |
| 6,186,184 | B1 * | 2/2001 | Eberhard | 139/1 E |
| 6,737,987 | B2 * | 5/2004 | Conner et al. | 340/946 |

(Continued)

FOREIGN PATENT DOCUMENTS

| | | |
|---|---|---|
| EP | 0490805 A1 | 6/1992 |
| EP | 1705542 A1 | 9/2006 |

OTHER PUBLICATIONS

P. M. Pawar and R. Ganguli, "On the effect of progressive damage on composite helicopter rotor system behavior," Composite Structures, vol. 78, pp. 410-423, 2007.

(Continued)

*Primary Examiner* — Jennifer Mehmood
*Assistant Examiner* — Pameshanand Mahase
(74) *Attorney, Agent, or Firm* — Carlson, Gaskey & Olds, P.C.

(57) ABSTRACT

A method of real-time rotor fault detection includes measuring a set of loads to obtain measured signals and virtually monitoring the set of loads to obtain estimated signals. The estimated signals are subtracted from the measured signals to obtain residuals and the residuals are compared to a categorical model. A categorical output representative of a rotor fault is identified within the categorical model.

14 Claims, 8 Drawing Sheets

(56) References Cited

U.S. PATENT DOCUMENTS

| | | | | |
|---|---|---|---|---|
| 7,039,554 | B2 | 5/2006 | Nguyen et al. | |
| 7,082,371 | B2 | 7/2006 | Griffin et al. | |
| 7,206,709 | B2 | 4/2007 | Griffin et al. | |
| 7,216,036 | B2 * | 5/2007 | Brady et al. | 701/510 |
| 7,216,063 | B2 | 5/2007 | Nguyen et al. | |
| 7,310,573 | B2 | 12/2007 | Stickling | |
| 7,321,845 | B2 | 1/2008 | Nguyen et al. | |
| 7,335,072 | B2 | 2/2008 | Rzadki et al. | |
| 7,383,136 | B1 | 6/2008 | Griffin et al. | |
| 7,409,319 | B2 * | 8/2008 | Kant et al. | 702/188 |
| 7,532,988 | B2 | 5/2009 | Khibnik et al. | |
| 7,623,974 | B2 | 11/2009 | Cipra | |
| 2004/0243310 | A1 * | 12/2004 | Griffin et al. | 702/10 |
| 2007/0168157 | A1 * | 7/2007 | Khibnik et al. | 702/182 |
| 2008/0114553 | A1 | 5/2008 | Morel | |

OTHER PUBLICATIONS

P. M. Pawar and R. Ganguli, "Helicopter rotor health monitoring—a review," Proceedings of the Institution of Mechanical Engineers Part G—Journal of Aerospace Engineering, vol. 221, pp. 631-647, 2007.

N. Roy and R. Ganguli, "Helicopter rotor blade frequency evolution with damage growth and signal processing," Journal of Sound and Vibration, vol. 283, pp. 821-851, 2005.

P. M. Pawar and R. Ganguli, "On the effect of matrix cracks in composite helicopter rotor blade," Composites Science and Technology, vol. 65, pp. 581-594, 2005.

P. M. Pawar and R. Ganguli, "Modeling multi-layer matrix cracking in thin walled composite rotor blades," Journal of the American Helicopter Society, vol. 50, pp. 354-366, 2005.

S. Murugan and R. Ganguli, "Aeroelastic stability enhancement and vibration suppression in a composite helicopter rotor," Journal of Aircraft, vol. 42, pp. 1013-1024, 2005.

S. R. Viswamurthy and R. Ganguli, "An optimization approach to vibration reduction in helicopter rotors with multiple active trailing edge flaps," Aerospace Science and Technology, vol. 8, pp. 185-194, 2004.

R. R. K. Reddy and R. Ganguli, "Structural damage detection in a helicopter rotor blade using radial basis function neural networks," Smart Materials & Structures, vol. 12, pp. 232-241, 2003.

P. M. Pawar and R. Ganguli, "Genetic fuzzy system for damage detection in beams and helicopter rotor blades," Computer Methods in Applied Mechanics and Engineering, vol. 192, pp. 2031-2057, 2003.

V. R. Akula and R. Ganguli, "Finite element model updating for helicopter rotor blade using genetic algorithm," Aiaa Journal, vol. 41, pp. 554-556, 2003.

R. Ganguli, "Health monitoring,of a helicopter rotor in forward flight using fuzzy logic," Aiaa Journal, vol. 40, pp. 2373-2381, 2002.

European Search Report for European Application No. 10154881.6 completed on Apr. 30, 2014.

* cited by examiner

| ROTOR HEALTH CONDITION | MAGNITUDE OF LOGITUDINAL HUB SHEAR | | PHASE OF LONGITUDINAL HUB SHEAR | | MAGNITUDE OF LATERAL HUB SHEAR | | | PHASE OF LATERAL HUB SHEAR | | MAGNITUDE OF HUB ROLL MOMENT | | PHASE ANGLE OF HUB ROLL MOMENT | | MAGNITUDE OF HUB PITCH MOMENT | | PHASE ANGLE OF HUB PITCH MOMENT | | MAGNITUDE OF HUB YAW MOMENT | PHASE ANGLE OF HUB YAW MOMENT |
|---|---|---|---|---|---|---|---|---|---|---|---|---|---|---|---|---|---|---|---|
| HARMONIC | 2 | 4 | 2 | 4 | 1 | 2 | 4 | 1 | 4 | 2 | 4 | 2 | 4 | 2 | 4 | 2 | 4 | 4 | 4 |
| NORMAL CONDITION | 0 | 0 | 0 | 0 | 0 | 0 | 0 | 0 | 0 | 0 | 0 | 0 | 0 | 0 | 0 | 0 | 0 | 0 | 0 |
| CHORDWISE IMBALANCE | 0 | 0 | 0 | 0 | 0 | 0 | 0 | 0 | 0 | 0 | + | 0 | + | 0 | 0 | 0 | 0 | + | + |
| TRACK SPLIT | 0 | -- | 0 | -- | 0 | 0 | 0 | 0 | 0 | ++ | 0 | -- | 0 | ++ | 0 | -- | 0 | 0 | 0 |
| TORSION CRACK | 0 | -- | 0 | + | 0 | 0 | 0 | 0 | 0 | 0 | ++ | 0 | - | 0 | 0 | 0 | 0 | 0 | 0 |
| BENDING CRACK | 0 | 0 | 0 | 0 | 0 | 0 | + | 0 | - | 0 | 0 | 0 | 0 | 0 | 0 | 0 | 0 | + | + |
| COMPOUND CRACK | 0 | -- | 0 | + | 0 | 0 | 0 | 0 | 0 | 0 | ++ | 0 | - | 0 | 0 | 0 | 0 | 0 | 0 |
| STIFFNESS DEFECT | 0 | 0 | 0 | 0 | 0 | 0 | 0 | 0 | 0 | 0 | 0 | 0 | 0 | 0 | 0 | 0 | 0 | + | - |
| MANUFACTURING DEFECT | 0 | 0 | 0 | 0 | 0 | 0 | 0 | 0 | 0 | 0 | 0 | 0 | 0 | 0 | 0 | 0 | 0 | + | - |
| FREEPLAY IN PITCH-CONTROL | 0 | 0 | 0 | 0 | ++ | 0 | 0 | ++ | 0 | 0 | + | 0 | - | 0 | + | 0 | + | 0 | 0 |
| FREEPLAY IN LAG DAMPER | 0 | 0 | 0 | 0 | 0 | 0 | 0 | 0 | 0 | 0 | 0 | 0 | 0 | 0 | + | 0 | + | 0 | 0 |
| FRICTION IN LAG HINGE | + | 0 | - | 0 | 0 | 0 | 0 | 0 | 0 | 0 | + | 0 | - | 0 | 0 | 0 | 0 | 0 | 0 |
| FRICTION IN FLAP HINGE | - | 0 | ++ | 0 | 0 | - | 0 | 0 | 0 | 0 | + | 0 | ++ | 0 | - | 0 | - | 0 | 0 |
| FRICTION IN PITCH CONTROL | - | 0 | - | 0 | 0 | 0 | 0 | 0 | 0 | 0 | 0 | 0 | 0 | 0 | - | 0 | - | 0 | 0 |

0=SAME AS HEALTHY CONDITION
- DECREASE RELATIVE TO HEALTHY CONDITION
+ INCREASE RELATIVE TO HEALTHY CONDITION

FIG.7

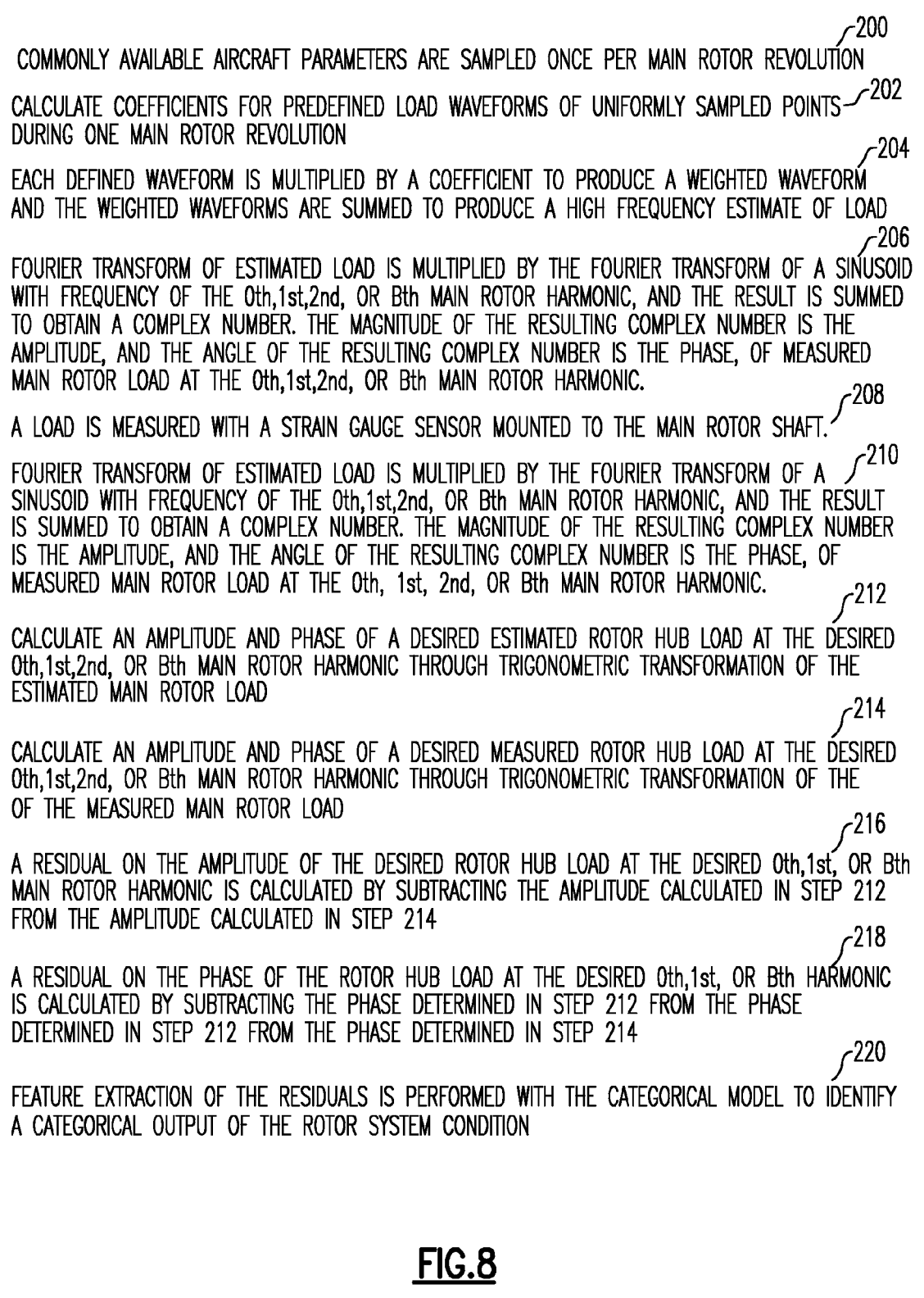

200

COMMONLY AVAILABLE AIRCRAFT PARAMETERS ARE SAMPLED ONCE PER MAIN ROTOR REVOLUTION

202

CALCULATE COEFFICIENTS FOR PREDEFINED LOAD WAVEFORMS OF UNIFORMLY SAMPLED POINTS DURING ONE MAIN ROTOR REVOLUTION

204

EACH DEFINED WAVEFORM IS MULTIPLIED BY A COEFFICIENT TO PRODUCE A WEIGHTED WAVEFORM AND THE WEIGHTED WAVEFORMS ARE SUMMED TO PRODUCE A HIGH FREQUENCY ESTIMATE OF LOAD

206

FOURIER TRANSFORM OF ESTIMATED LOAD IS MULTIPLIED BY THE FOURIER TRANSFORM OF A SINUSOID WITH FREQUENCY OF THE 0th,1st,2nd, OR Bth MAIN ROTOR HARMONIC, AND THE RESULT IS SUMMED TO OBTAIN A COMPLEX NUMBER. THE MAGNITUDE OF THE RESULTING COMPLEX NUMBER IS THE AMPLITUDE, AND THE ANGLE OF THE RESULTING COMPLEX NUMBER IS THE PHASE, OF MEASURED MAIN ROTOR LOAD AT THE 0th,1st,2nd, OR Bth MAIN ROTOR HARMONIC.

208

A LOAD IS MEASURED WITH A STRAIN GAUGE SENSOR MOUNTED TO THE MAIN ROTOR SHAFT.

210

FOURIER TRANSFORM OF ESTIMATED LOAD IS MULTIPLIED BY THE FOURIER TRANSFORM OF A SINUSOID WITH FREQUENCY OF THE 0th,1st,2nd, OR Bth MAIN ROTOR HARMONIC, AND THE RESULT IS SUMMED TO OBTAIN A COMPLEX NUMBER. THE MAGNITUDE OF THE RESULTING COMPLEX NUMBER IS THE AMPLITUDE, AND THE ANGLE OF THE RESULTING COMPLEX NUMBER IS THE PHASE, OF MEASURED MAIN ROTOR LOAD AT THE 0th, 1st, 2nd, OR Bth MAIN ROTOR HARMONIC.

212

CALCULATE AN AMPLITUDE AND PHASE OF A DESIRED ESTIMATED ROTOR HUB LOAD AT THE DESIRED 0th,1st,2nd, OR Bth MAIN ROTOR HARMONIC THROUGH TRIGONOMETRIC TRANSFORMATION OF THE ESTIMATED MAIN ROTOR LOAD

214

CALCULATE AN AMPLITUDE AND PHASE OF A DESIRED MEASURED ROTOR HUB LOAD AT THE DESIRED 0th,1st,2nd, OR Bth MAIN ROTOR HARMONIC THROUGH TRIGONOMETRIC TRANSFORMATION OF THE OF THE MEASURED MAIN ROTOR LOAD

216

A RESIDUAL ON THE AMPLITUDE OF THE DESIRED ROTOR HUB LOAD AT THE DESIRED 0th,1st, OR Bth MAIN ROTOR HARMONIC IS CALCULATED BY SUBTRACTING THE AMPLITUDE CALCULATED IN STEP 212 FROM THE AMPLITUDE CALCULATED IN STEP 214

218

A RESIDUAL ON THE PHASE OF THE ROTOR HUB LOAD AT THE DESIRED 0th,1st, OR Bth HARMONIC IS CALCULATED BY SUBTRACTING THE PHASE DETERMINED IN STEP 212 FROM THE PHASE DETERMINED IN STEP 212 FROM THE PHASE DETERMINED IN STEP 214

220

FEATURE EXTRACTION OF THE RESIDUALS IS PERFORMED WITH THE CATEGORICAL MODEL TO IDENTIFY A CATEGORICAL OUTPUT OF THE ROTOR SYSTEM CONDITION

FIG.8

ROTOR SYSTEM HEALTH MONITORING USING SHAFT LOAD MEASUREMENTS AND VIRTUAL MONITORING OF LOADS

REFERENCE TO RELATED APPLICATIONS

The present disclosure claims the benefit of U.S. Provisional Patent Application No. 61/156,815, filed Mar. 2, 2009.

BACKGROUND

The present disclosure relates to a health monitoring system, and more particularly to a real-time fault detection and isolation system.

Helicopter rotor systems may be subject to a number of fault types such as imbalance, track splits, cracks, defects, and freeplay or friction in the pitch control systems, lag systems and flap systems. Early detection and diagnoses of these fault conditions facilitates the reduction of aircraft maintenance costs and further enhances flight safety.

Under a fixed flight condition and in the absence of other disturbances, detection and diagnoses of fault types may be determined by measurement of rotor hub loads. However, nominal hub loads are a strong function of aircraft flight condition, pilot inputs, and other disturbances. The magnitude of hub load changes from flight conditions, pilot inputs, and disturbances is significant enough to effectively obscure the effect of rotor system faults on hub loads.

SUMMARY

A method of real-time rotor fault detection according to an exemplary aspect of the present disclosure includes measuring a set of loads to obtain measured signals and virtually monitoring the set of loads to obtain estimated signals. The estimated signals are subtracted from the measured signals to obtain residuals and the residuals are compared to a categorical model. A categorical output representative of a rotor fault is identified within the categorical model.

A method to virtually monitor a load on a rotor system of a rotary wing aircraft according to an exemplary aspect of the present disclosure includes sampling at least one aircraft parameter once per main rotor revolution. Calculating coefficients for a set of high-frequency waveforms from the at least one aircraft parameter. Multiplying each of the set of high-frequency waveforms by the coefficient to obtain a set of weighted waveforms. Summing the weighted waveforms to produce an estimate of the load on the rotor system.

A system for real-time rotor system condition detection according to an exemplary aspect of the present disclosure includes a sensor system operable to measure a set of loads to obtain measured signals. A module operable to virtually monitoring the set of loads to obtain estimated signals and execute a real-time fault detection and isolation algorithm to subtract the estimated signals from the measured signals to obtain residuals and compare the residuals to a categorical model to identify a categorical output representative of a rotor system condition within the categorical model.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 7 is a chart of categorical outputs for use with the real-time fault detection and isolation algorithm; and FIG. 8 is a block diagram illustrating operation of the real-time fault detection and isolation algorithm.

DETAILED DESCRIPTION

Figure 1:
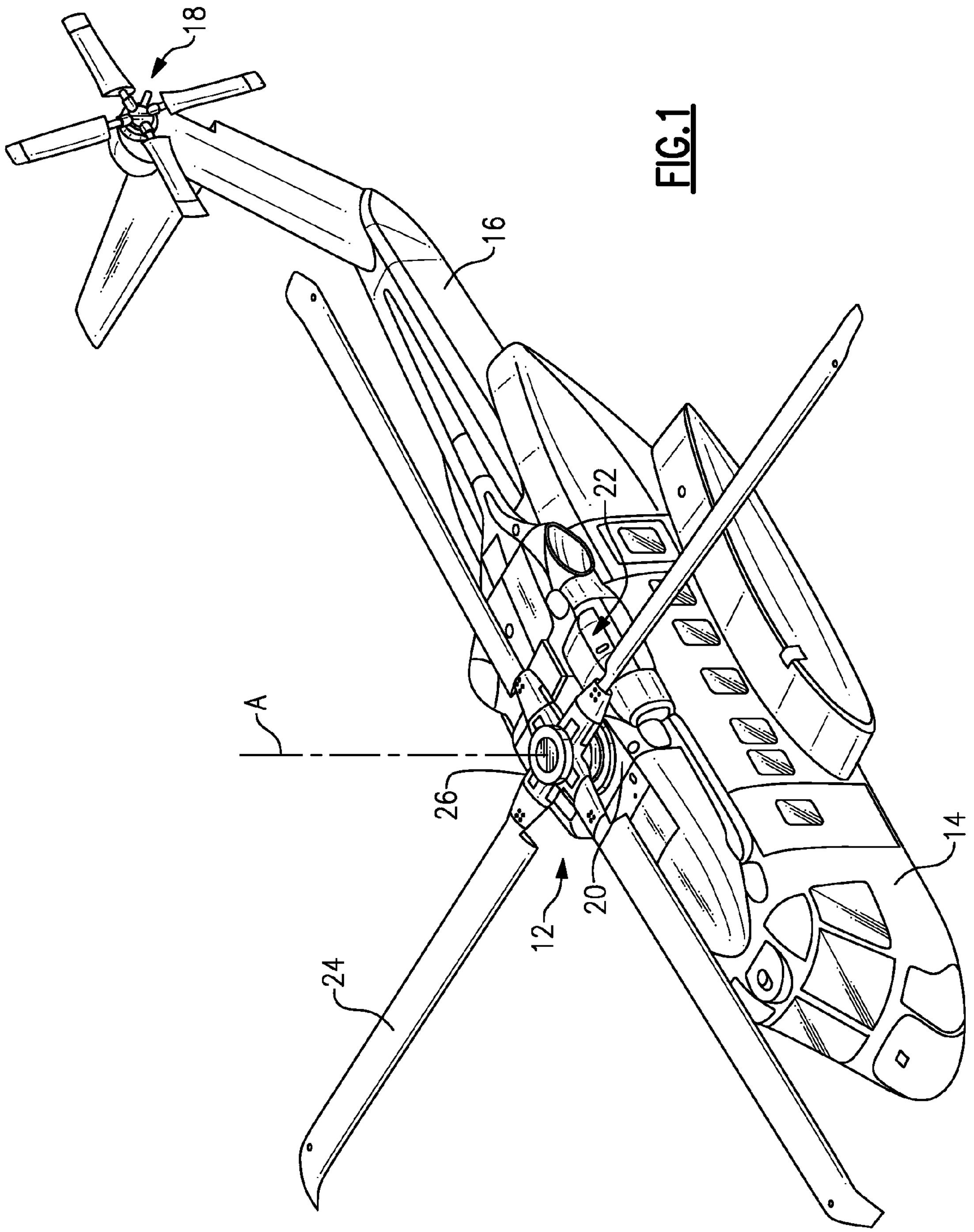
FIG. 1 is a general perspective view of an exemplary rotary wing aircraft embodiment for use with the present disclosure.
Figure 2:
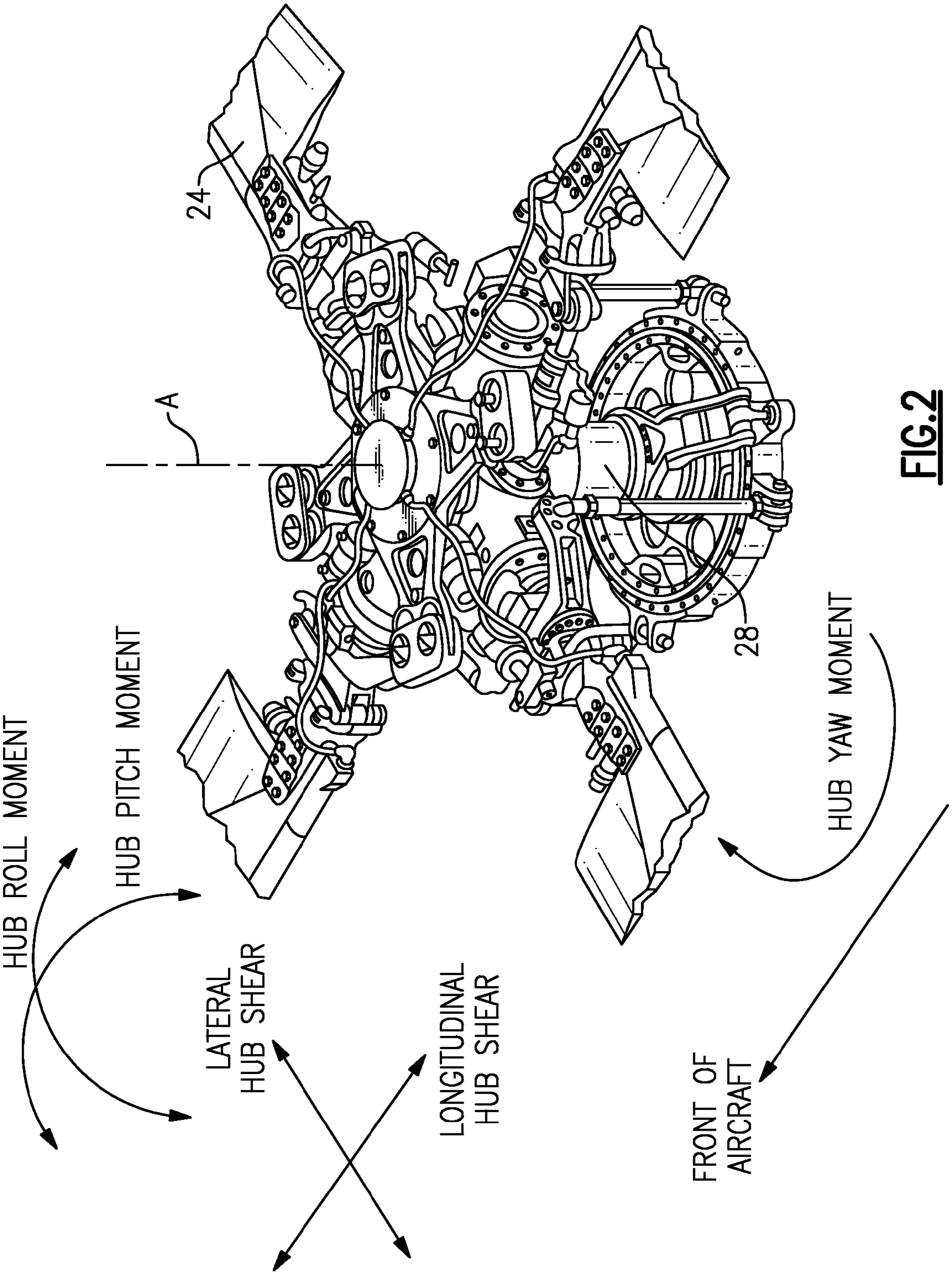
FIG. 2 is a general perspective view of a rotor system for a rotary wing aircraft embodiment.

FIG. 1 schematically illustrates an exemplary vertical takeoff and landing (VTOL) rotary-wing aircraft 10. The aircraft 10 in the disclosed, non-limiting embodiment includes a main rotor system 12 supported by an airframe 14 having an extending tail 16 which mounts an anti-torque system 18. The main rotor system 12 is driven about an axis of rotation A through a main rotor gearbox (MGB) 20 by a multi-engine powerplant system 22—here having two engine packages ENG1, ENG2. The multi-engine powerplant system 22 generates the power available for flight operations and couples such power to the main rotor assembly 12 and the anti-torque system 18 through the MGB 20. The main rotor system 12 includes a multiple of rotor blades 24 mounted to a rotor hub 26 driven by a main rotor shaft 28 (FIG. 2). Although a particular helicopter configuration is illustrated and described in the disclosed embodiment, other configurations and/or machines, which have a rotating frame of reference and a fixed frame of reference will also benefit herefrom.

Referring to FIG. 2, the main rotor system 12 may be subject to various faults which are known to manifest themselves in changes in the amplitude or phase of the main rotor hub moments and in-plane shears typically at the $0^{th}$, $1^{st}$, $2^{nd}$, and $B^{th}$ harmonics.

It should be understood that the $0^{th}$, $1^{st}$, $2^{nd}$ and $4^{th}$ harmonics may be uniquely suited to a rotary-wing aircraft main rotor system 12 with four blades 24. In general, if a rotary-wing aircraft has B blades, the harmonics may be defined as: $0^{th}$ harmonic (steady load); $1^{st}$ harmonic (once per revolution); $2^{nd}$ harmonic (specific blade gets to the opposite position on the rotor disk); and the Bth harmonic in which B equals 4 for a 4 blade rotary-wing aircraft; B equals 6 for a 6 blade rotary-wing aircraft; B equals 7 for a 7 bladed rotary-wing aircraft, etc.

The main rotor system 12 is instrumented to measure loads to obtain measured signals in combination with the virtual monitoring of the same loads to obtain estimated signals of the loads. A residual is calculated by subtraction of the estimated signals from the measured signals. This residual is highly sensitive to rotor system damage, even in the presence of disturbances which result from aircraft operating condition. For example, by monitoring magnitude and phase residuals at the $0^{th}$, $1^{st}$, $2^{nd}$, and $4^{th}$ harmonics, rotor system damage readily detected and diagnosed.

Model Development

Figure 3:
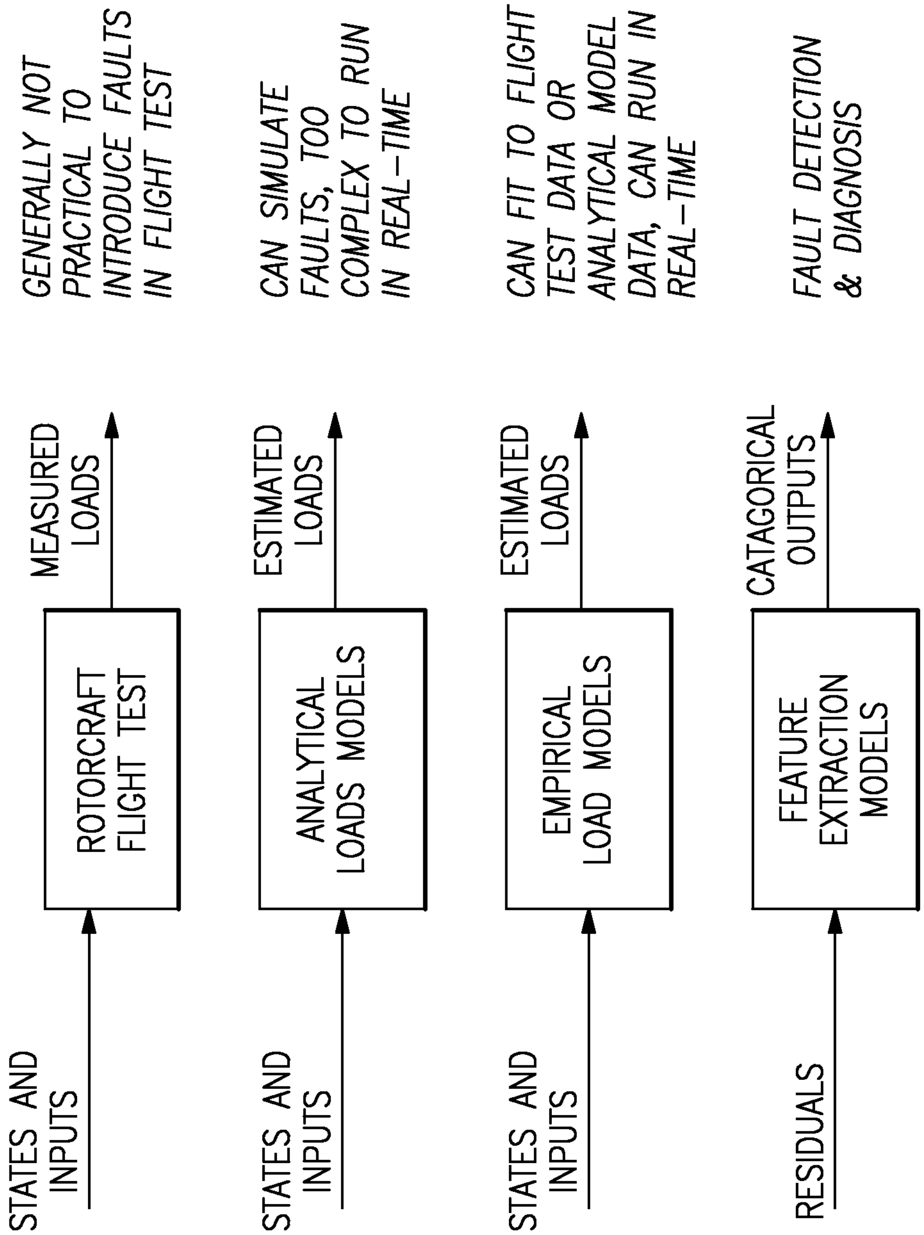
FIG. 3 is a block diagram of model development to implement a real-time fault detection and isolation algorithm.

Referring to FIG. 3, analytical models, empirical models, and feature extraction models are developed, validated, and implemented from flight test data. Analytical models are used to predict how rotor system faults may be manifested in amplitude and phase of rotor hub moments and shears but Analytical models are of significant complexity. Empirical models are not as accurate as analytical models but provide estimates in real-time what the loads should be for a healthy aircraft given the operational condition of the aircraft. Feature extraction models are then developed from the empirical models to provide fault detection and isolation finding, based on calculated residuals.

Figure 4:
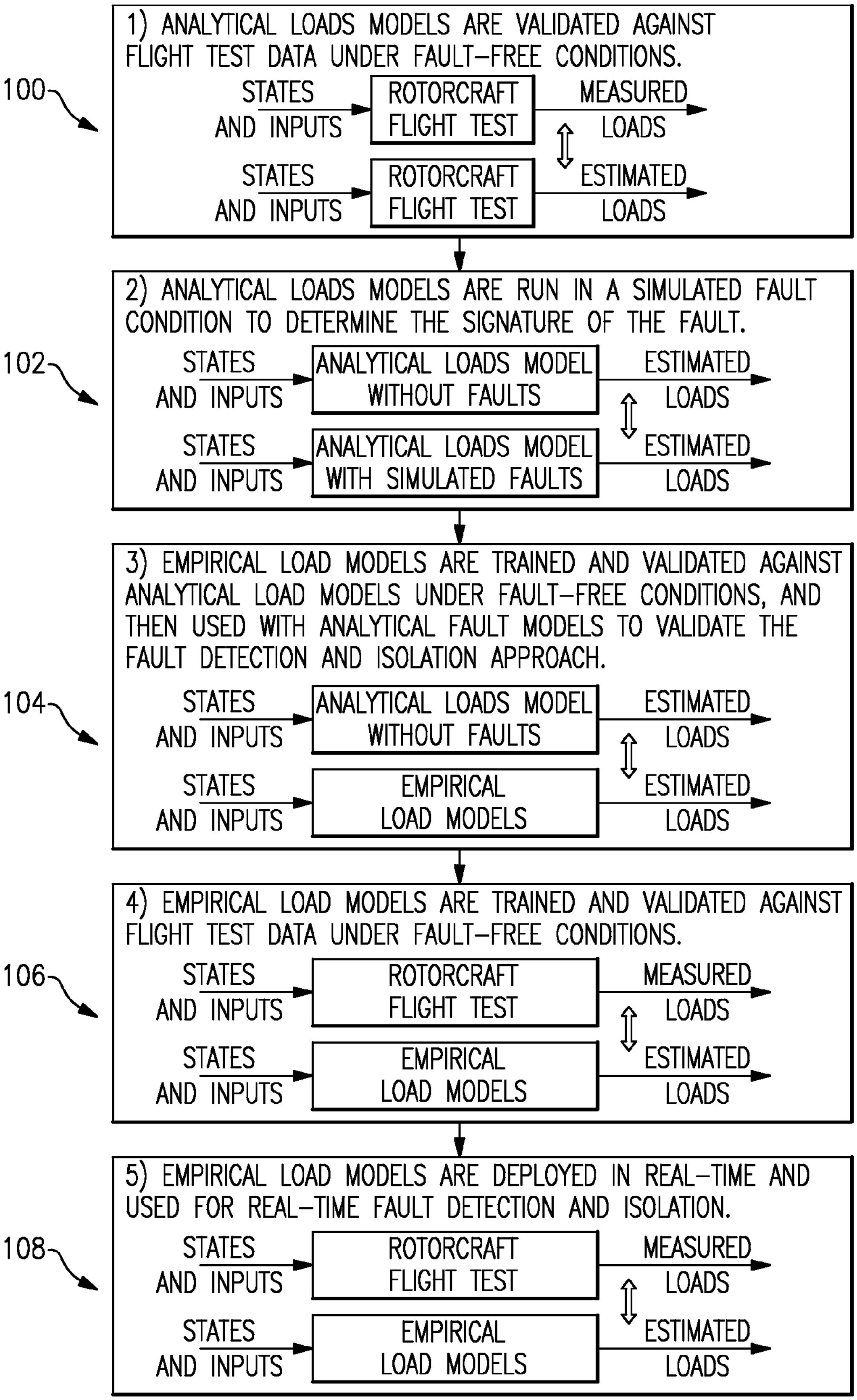
FIG. 4 is a block diagram of model development validation and implementation for the real-time fault detection and isolation algorithm.

Referring to FIG. 4, the analytical load models may be developed with modeling software such as Rotorcraft Comprehensive Analysis System (RCAS); Automated Dynamic Analysis of Mechanical Systems (ADAMS), University of Maryland Advanced Rotorcraft Code (UMARC) or others may be used to build an aeroelastic model of the rotor system including for example only, the rotor blades, pushrods, dampers, etc. The analytical load models are parameterized with known dimensional and material characteristic data.

Validation of Analytical Load Models Against Flight Test Data

The analytical load model is validated against flight test data under fault-free conditions (step 100). To develop the analytical load models, a heavily instrumented aircraft undergoes flight test in which flight test data is recorded. The flight test data includes, for example, aircraft state parameters as well as high frequency measurements of main rotor shaft bending, shear, and torque. The flight test data is stored in a solid-state device on the aircraft during flight test then decoded and moved to a computer system for analysis and development of analytical load models.

The basic validation steps include, for example, comparison of predicted pitch control angles to measured pitch angles, and predicted power conditions to measured power condition actually measured in flight test. If these signals to do not match closely, the analytical model may be further refined.

Use of Analytical Models to Develop Fault Signatures

Referring to Step 102, the analytical load models are utilized to develop a signature of how the rotor system faults affect measurable signals. To model faults, the physical significance of the fault is analyzed, and a simplified representation of this effect is inserted into the analytical load model. For example, chordwise imbalance may be modeled as shift in the blade center of gravity; pitch-control system freeplay may be modeled as a nonlinear spring; and friction in the flap hinge may be modeled as Coulomb damping [See "Simulation of Helicopter Rotor-System Structural Damage, Blade Mistracking, Friction, and Freeplay", Ranjan Ganguli, Inderjit Chopra, David J. Haas, Journal of Aircraft 1998, 0021-8669 vol. 35 no. 4 (591-597), for more examples].

Rotor system faults may be inserted into the analytical load model one at a time, and the analytical load model is executed with the same set of inputs that were used for the fault-free model in step 100. The analytical load model with faults provides for identification of a wide range of physical signals, some of which may be measureable while other may not be directly measurable.

Once the particular rotor system faults have been modeled, those signals that are significantly affected in the presence of particular rotor system faults are identified. The identifiable signals that can be measured directly or indirectly and can be estimated accurately with empirical load models are then selected.

For example, the magnitude and amplitude of main rotor hub moments and in-plane shears at various rotor harmonics are significantly changed in the presence of many rotor system faults. The magnitude and amplitude of main rotor hub moments and in-plane shears also can be measured indirectly using just three strain measurements: main rotor shaft bending, main rotor shaft torque, and main rotor shaft shear. Main rotor shaft bending, main rotor shaft torque, and main rotor shaft shear can also be accurately estimated with empirical load models. Thus, these identifiable signals (main rotor shaft bending, main rotor shaft torque, and main rotor shaft shear) that are sensitive to the presence of main rotor system faults (such as imbalance, track splits, cracks, defects, and freeplay or friction in the pitch control systems, lag systems and flap systems) are selected for identification of various rotor system faults.

Empirical Models

Referring to step 104, once the analytical load models have been used to find the identifiable signals that are sensitive to the presence of rotor system faults, empirical load models are trained and validated against the analytical load models under fault-free conditions. This validates the fault detection and isolation.

In this disclosed non-limiting embodiment, the empirical load model is developed for main rotor shaft bending ($M\widehat{RS}$ EB), main rotor shaft shear ($M\widehat{RS}$ EV) and main rotor shaft torque ($M\widehat{RS}$ EQ).

Building and Validating Models for Virtual Monitoring of Loads

Referring to step 106, the empirical load models are trained and validated against flight test data under fault-free conditions. The flight test data may be analyzed with functions specifically intended for development of empirical load models within a program such as in MATLAB as follows.

First, a large flight data set representative of a range of flight test conditions, for example, level flight, take-off, turns, pull-outs, push-overs, and dives, is compiled so that the empirical model will be accurate over a wide range of conditions.

Next, measured high-frequency records of main rotor shaft bending, torque, and shear from the flight test data are analyzed using principal component analysis or Fourier analysis to generate a small set of orthogonal waveforms, that, when mixed in appropriate proportions, are used to accurately reconstruct the measured signals.

A set of load vectors is used to develop the set of orthogonal waveforms ("basis vectors"). One vector consists of the measurement of the load of interest over one main rotor revolution. If the load is sampled at 80 points per main rotor revolution, then each vector has a length of 80. Typically, hundreds or thousands of such load vectors are available. Principal components analysis may be used to find a small set of orthogonal vectors (typically ten or twenty) that can be used to reconstruct with high accuracy the original set (of hundreds or thousands) of load vectors. Two vectors are said to be orthogonal if the dot product of the vectors is zero. Principle components analysis is performed by singular value decomposition of the original set of load vectors. For more information on principal components analysis, see, e.g., L. H. Chiang, E. L. Russell, and R. D. Braatz, *Fault Detection and Diagnosis in Industrial Systems*, Springer Verlag, 2001.

Next, a set of aircraft state parameters such as, for example, airspeed, torque, altitude, collective position, cyclic longitudinal position, cyclic lateral position, and vertical acceleration are determined and correlated with the measured waveforms.

Finally, least-squares, weighted least-squares, or generalized least-squares regression is used to develop matrices to generate coefficients for the set of orthogonal waveforms based on the selected aircraft state parameters.

Commonly available aircraft parameters including, for example, pilot inputs and aircraft airspeed, altitude, attitude, and accelerations are sampled once per main rotor revolution. The duration of a main rotor revolution can be determined with a main rotor indexer. The exact set of aircraft state parameters relates to which of main rotor shaft bending, torque, and shear are being estimated.

The aircraft parameters are used to calculate the coefficients for a set of pre-defined high-frequency waveforms. The term high frequency as utilized herein means at least 8 samples per main rotor revolution. At least 8 samples per main rotor revolution are required because this is the Nyquist sampling rate required to estimate the amplitude and phase of loads at the 4th main rotor harmonic. The Nyquist sampling theorem states that in order to reconstruct amplitude and phase information at a given frequency without aliasing, it is required to sample data at two times that frequency.

To calculate coefficients for the set of pre-defined high-frequency waveforms, the vector of aircraft state parameters is multiplied by a pre-defined regression matrix to produce a vector of waveform coefficients.

The regression matrix is developed during the model building stage (Steps 100-106) prior to real-time deployment (Step 108). The inputs for the regression analysis are the set of orthogonal basis vectors, the original large set of load vectors, and the set of aircraft state parameters.

Consider one load vector y of length 80, for example, measured during a specified main rotor revolution, the vector of measured aircraft state parameters x of length 20, for example, recorded during that main rotor revolution, and a set of ten orthogonal basis vectors stored in the rows of a matrix U with matrix of dimensions of 10 columns and 80 rows. The objective of least squares regression is to find parameters a (vector of length 10) and matrix B (10 rows and 20 columns) such that:

$$U(a+Bx)=\hat{y}\cong y$$

The quantity (a+Bx) is a vector of ten coefficients for the ten orthogonal basis vectors. Least squares regression finds a and B such that:

$$\sum_{i=1}^{80}(\hat{y}_i - y_i)^2$$

is minimized over the entire set of hundreds or thousands of training load vectors. The method of least squares is well-known and is described in textbooks on linear algebra, e.g., Gilbert Strang, *Linear Algebra and Its Applications*, Third Edition, Harcourt Brace Jovanovich, 1988. Weighted least-squares can be used to make the empirical model more accurate for some conditions than others, for example, more accurate for aggressive aircraft maneuvers than for steady level flight. Generalized least-squares can be used to account for the fact that error terms are not independent, but are correlated.

Each predefined high-frequency waveform is multiplied by its coefficient to produce a weighted waveform and then the weighted waveforms are summed to produce a high frequency estimate of the load of interest, such as main rotor shaft bending, main rotor shaft torque, and main rotor shaft shear. If the waveform vectors are w1, w2, w3, w4, w5, w6, w7, w8, w9, and w10, and the coefficients are c1, c2, c3, c4, c5, c6, c7, c8, c9, and c10, then the estimated load L (which is either main rotor shaft bending, torque, or shear) for the main rotor revolution of interest is L=c1*w1+c2*w2+c3*w3+c4*w4+c5*w5+c6*w6+c7*w7+c8*w8+c9*w9+c10*w10.

This process may be performed once per main rotor revolution for each of main rotor shaft bending, torque, and shear.

Real Time Execution of the Health Monitoring System.

Figure 5:
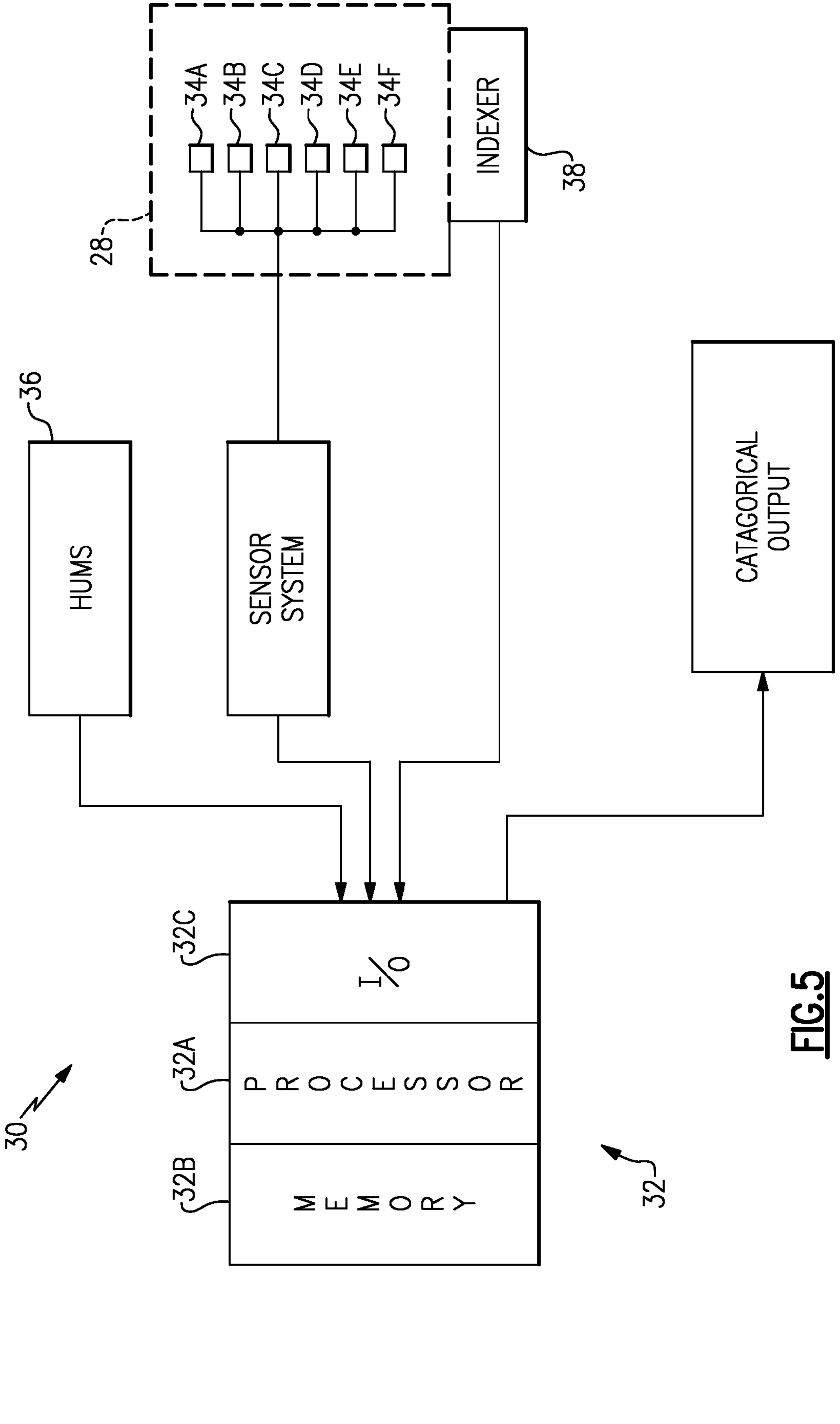
FIG. 5 is a block diagram of an exemplary module used to implement the real-time fault detection and isolation algorithm.
Figure 6:
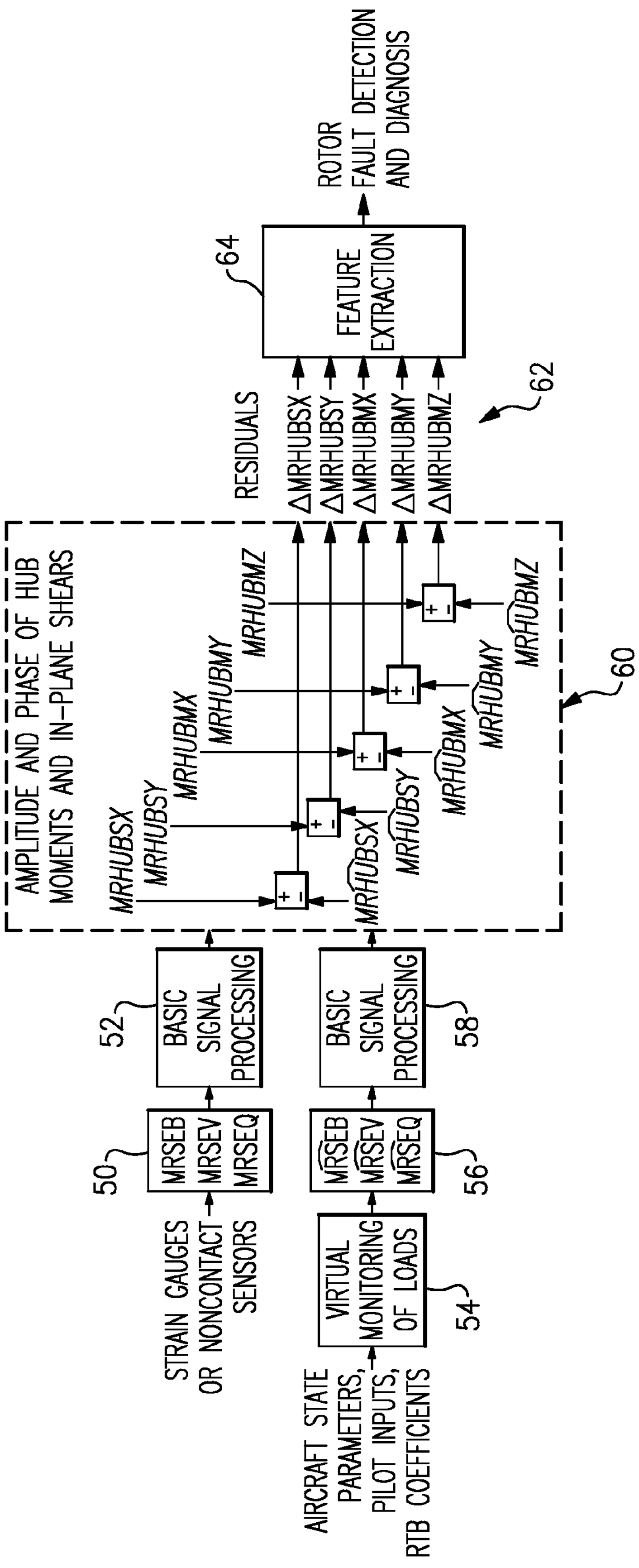
FIG. 6 is a block diagram of the real-time fault detection and isolation algorithm.

Referring to FIG. 5, a real-time fault detection and isolation system 30 may include a module 32 that executes a real-time fault detection and isolation algorithm (FIG. 6). In one non-limiting embodiment, the module 32 may be a portion of a flight control computer, a portion of a central vehicle control, a portion of the HUMS, a stand-alone line replaceable unit or other system.

The module 32 typically includes a processor 32A, a memory 32B, and an interface 32C. The processor 32A may be any type of known microprocessor having desired performance characteristics. The memory 32B may, for example only, include UVPROM, EEPROM, FLASH, RAM, ROM, DVD, CD, a hard drive, or other computer readable medium which stores the data and control algorithms described herein. The interface 32C facilitates communication with other avionics and systems such as sensors 34A-34F and a health and usage monitoring system (HUMS) 36 and indexer 38 (illustrated schematically).

The main rotor shaft 28 is equipped with the six strain sensors 34A-34F. The strain sensors are arranged in pairs and oriented to measure shaft, bending, torque, and shear. The measured values disclosed herein are referred to herein as main rotor shaft bending (MRSEB), main rotor shaft torque (MRSEQ), and main rotor shaft shear (MRSEV). The strain sensors may include, for example only, foil gauge strain sensors, piezoresistive strain sensors such as those available from PCB Company Pty Ltd of Victoria, Australia, fiber optic Bragg sensors such as those available from Insensys Ltd. of Southampton, United Kingdom, noncontact torque/strain sensors such as those available from Magnetech Corp. of Novi, Mich. USA. The main rotor shaft 28 is also equipped with the indexer 38 to track the rotational position of the main rotor shaft 28. It should be understood that other sensors may alternatively or additionally be provided.

The sensors 34A-34F provide actual strain measurement which are utilized in conjunction with the empirical load model which may be programmed within the memory 32B to detect and diagnose the variety of rotor system faults. A wireless sensor node may be utilized to communicate the strain measurement data from the strain sensors 34A-34F and the indexer 38 to the module 32.

The verified empirical load model is integrated within the real-time fault detection and isolation system 30 for flight operations so that the empirical load models may be deployed in real-time for real-time fault detection and isolation (FIG. 4; Step 108). That is, the virtual monitoring of loads is accomplished through use of empirical load model for operation in real time. The empirical load model may be stored within the memory 32B for operations with the real time fault detection and isolation algorithm. Such real time detection operates to reduce aircraft maintenance costs without a negative affect on flight safety.

Referring to FIG. 6, the real-time fault detection and isolation algorithm is schematically illustrated. The functions of the algorithm are disclosed in terms of functional block diagrams, and it should be understood by those skilled in the art with the benefit of this disclosure that these functions may be enacted in either dedicated hardware circuitry or programmed software routines on a computer readable medium capable of execution in a microprocessor based electronics control embodiment such as the module 32.

Real-Time Measurement of Loads

Measured signals from the strain sensors 34A-34F are acquired and correlated with the main rotor indexer 38. The main rotor indexer 38 establishes a reference signal to establish the phase of the recorded load measurements at various main rotor harmonics such as the $0^{th}$, $1^{st}$, $2^{nd}$, and $4^{th}$ harmonics.

The amplitude and phase of the main rotor shaft bending (MRSEB), torque (MRSEV) and shear (MRSEQ) signals (at 50) from the strain sensors 34A-34F are utilized to calculate, via trigonometry, the measured amplitude and phase of the rotor hub moments and in plane shears at the desired frequencies of interest with basic signal processing (at 52).

For a particular frequency ($1^{st}$, $2^{nd}$, and $4^{th}$ harmonics), the amplitude (at that frequency) of main rotor shaft bending (MRSEB) is multiplied by the cosine of the phase (at that frequency) of main rotor shaft bending (MRSEB) to calculate the rotor hub roll moment.

For a particular frequency ($1^{st}$, $2^{nd}$, and $4^{th}$ harmonics), the amplitude of main rotor shaft bending (MRSEB) is multiplied by the negative sine of the phase of main rotor shaft bending (MRSEB) to calculate the hub pitch moment.

For a particular frequency ($1^{st}$, $2^{nd}$, and $4^{th}$ harmonics), main rotor shaft torque (MRSEV) is multiplied by a scaling factor to calculate the yaw moment.

For a particular frequency ($1^{st}$, $2^{nd}$, and $4^{th}$ harmonics), the amplitude of main rotor shaft shear (MRSEQ) is multiplied by the negative cosine of phase of main rotor shaft shear (MRSEQ) to calculate the lateral hub shear.

For a particular frequency ($1^{st}$, $2^{nd}$, and $4^{th}$ harmonics), the amplitude of main rotor shaft shear (MRSEQ) is multiplied by the negative sine of phase of main rotor shaft shear (MRSEQ) to calculate the longitudinal hub shear.

Real-Time Execution of the Empirical Load Model for Virtual Monitoring of Loads

The aircraft state parameters are sampled once per main rotor revolution and the vector of aircraft state parameters are multiplied by a regression matrix to produce coefficients for orthogonal waveforms (at 54). The orthogonal waveforms are combined to produce high-frequency (~320 Hz) estimates of the main rotor shaft bending ($M\widehat{RS}$ EB) main rotor shaft shear ($M\widehat{RS}$ EV) and main rotor shaft torque ($M\widehat{RS}$ EQ) (at 56). Then, the same basic signal processing applied to the physically measured signals (at 52) are applied to the estimated signals, to produce an estimate of features on rotor hub moments and in-plane shears (at 58). That is, virtual monitoring of loads is used to provide estimated signals for the main rotor shaft bending ($M\widehat{RS}$ EB), main rotor shaft shear ($M\widehat{RS}$ EV) and main rotor shaft torque ($M\widehat{RS}$ EQ) which are the same signals as the measured signals of main rotor shaft bending (MRSEB), main rotor shaft shear (MRSEV) and main rotor shaft torque (MRSEQ).

Real-Time Calculation of Residuals

The estimated signal of rotor hub loads are subtracted from the measured signals of the rotor hub loads to produce residuals (at 60). Although FIG. 6 schematically illustrates five residuals (at 62), there may be, for example, actually 5×3×2=30 residuals which include five moments and shears, three frequencies ($1^{st}$, $2^{nd}$, and $4^{th}$ harmonics) and 2 features (amplitude and phase).

In the absence of faults, the residuals are close to zero. In the presence of faults, the residuals become strongly negative or positive which may be utilized for feature extraction. The residuals are highly sensitive to rotor system damage, even in the presence of disturbances resulting from aircraft operating condition. By monitoring magnitude and phase residuals at the $0^{th}$, $1^{st}$, $2^{nd}$, and $4^{th}$ harmonics, rotor system damage can be successfully detected and diagnosed.

Real-Time Feature Extraction

Feature extraction (at 64) compares the numerical residuals to a categorical model (FIG. 7) to produce a categorical output (at 66). Common feature extraction techniques are neural networks, support vector machines, fuzzy logic, and discriminant analysis. The categorical model, when applied to the numerical residuals, provides the categorical output, such as: "No fault present"; "Pitch-control freeplay likely present"; or "Chordwise imbalance likely present" (FIG. 7).

Recordation

If the feature extraction model produces an output other than "no fault present", a warning is recorded. The warning may then be recorded within the HUMS 36.

Operation Example

In one operational example with reference to FIG. 8, sixteen commonly available aircraft parameters such as aircraft gross weight, density altitude, main rotor speed, airspeed, vertical acceleration, rate of climb, engine torque, pitch attitude, roll attitude, yaw rate, pitch rate, roll rate, longitudinal stick position, lateral position, pedal position, and collective position are sampled once per main rotor revolution (step 200).

This vector of sixteen parameters is multiplied by a predetermined regression matrix with ten rows and sixteen columns to produce ten coefficients (c1, c2, c3, c4, c5, c6, c7, c8, c9, and c10) for ten predefined load waveforms, each waveform having eighty values representing the main rotor shaft shear at eighty uniformly sampled points during one main rotor revolution (Step 202).

Each waveform is multiplied by a coefficient to produce a weighted waveform and then the weighted waveforms are summed to produce a high frequency estimate of main rotor shaft shear (Step 204). If the waveform vectors are w1, w2, w3, w4, w5, w6, w7, w8, w9, and w10, and the coefficients are c1, c2, c3, c4, c5, c6, c7, c8, c9, and c10, then the estimated signal for main rotor shaft shear L for the main rotor revolution of interest is:

$$L=c1*w1+c2*w2+c3*w3+c4*w4+c5*w5+c6*w6+c7*w7+c8*w8+c9*w9+c10*w10$$

The estimated load waveform L is aligned to begin at each successive main rotor indexer zero crossings.

In step 206, the amplitude and phase of the estimated main rotor shaft shear at the 1st main rotor harmonic is calculated by computing the Fourier transform F(L) of the estimated load vector L; multiplying this by the Fourier transform F(N) of a sampled sinusoid N with the same frequency as the main rotor, with unit amplitude, with zero phase shift with respect to the main rotor indexer, sampled at the same rate as L; and summing the elements of F(L)*F(N). The magnitude of the resulting complex number is the amplitude, and the angle of the resulting complex number is the phase, of estimated main rotor shear at the 1st main rotor harmonic.

In step 208, the main rotor shaft shear is measured with a strain gauge sensor mounted to the main rotor shaft.

In step 210, the amplitude and phase of the measured main rotor shaft shear at the 1st main rotor harmonic is calculated by computing the Fourier transform F(L) of the measured load L; multiplying this by the Fourier transform F(N) of a sampled sinusoid N with the same frequency as the main rotor, with unit amplitude, with zero phase shift with respect to the main rotor indexer, sampled at the same rate as L; and summing the elements of F(L)*F(N). The magnitude of the resulting complex number is the amplitude, and the angle of the resulting complex number is the phase, of measured main rotor shear at the 1st main rotor harmonic.

In step 212, to calculate the amplitude of the estimated lateral hub shear at the 1st main rotor harmonic, the amplitude of main rotor shaft shear (calculated in step 206) is multiplied by the negative cosine of phase of main rotor shaft shear (calculated in step 206) to calculate amplitude of the lateral hub shear. The phase of the estimated hub shear at the 1st main rotor harmonic is the phase calculated in step 206.

In step 214, to calculate the amplitude of the measured lateral hub shear at the 1st main rotor harmonic, the amplitude of main rotor shaft shear (calculated in step 210) is multiplied by the negative cosine of phase of main rotor shaft shear (calculated in step 206) to calculate amplitude of the lateral hub shear. The phase of the measured hub lateral shear at the 1st main rotor harmonic is the phase calculated in step 210.

In step 216, a residual on the amplitude of lateral hub shear at the 1st main rotor harmonic is calculated by subtracting the amplitude calculated in step 212 from the amplitude calculated in step 214. In this example, the residual is 200 pounds force.

In step 218, a residual on the phase of lateral hub shear at the 1st main rotor harmonic is calculated by subtracting the phase determined in step 212 from the phase determined in step 214. In this example, the residual is 30 degrees phase angle.

In step 220, a positive residual in 1st harmonic lateral hub shear, coupled with a strong positive residual in 1st harmonic phase angle for lateral shear, is identified with high confidence as freeplay in the pitch control system by the real-time fault detection and isolation system 30 (FIG. 7).

In step 222, the categorical output, for example only, a freeplay in the pitch control system warning is then recorded within the HUMS 36. When the aircraft lands, data from the HUMS system may be transferred to a ground station such as a laptop computer. An aircraft maintainer is thereby provided with the categorical output such that the aircraft maintainer in this example, will be prompted to physically inspect the push-rods, and confirm that that, indeed, the push rod ends have deteriorated such that there is freeplay. In this manner, the maintainer is quickly alerted to rotor system faults and provided with actionable diagnostics.

In step 224, the aircrew may additionally be alerted should the categorical output require more immediate attention by the aircrew. That is, the aircraft warning system may additionally be triggered to alert the aircrew of a potential fault.

The real-time fault detection and isolation system 30 thereby facilitates condition-based maintenance such that rotor system components can be replaced only when they degrade, rather than on a fixed schedule.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of real-time rotor system condition detection comprising:

measuring a set of loads to obtain measured signals;

virtually monitoring the set of loads to obtain estimated signals, the virtual monitoring accomplished through use of an empirical load model representing a real-time environment;

subtracting the estimated signals from the measured signals to obtain residuals;

comparing the residuals to a categorical model; and identifying a categorical output representative of a rotor system condition within the categorical model.

2. A method as recited in claim 1, wherein the set of loads include:

main rotor shaft bending;

main rotor shaft shear; and main rotor shaft torque.

3. A method as recited in claim 1, wherein the measured signals include a feature at a particular harmonic frequency.

4. A method as recited in claim 3, wherein the feature includes a magnitude.

5. A method as recited in claim 3, wherein the feature includes a phase angle.

6. A method as recited in claim 1, wherein the estimated signals include a feature at a particular harmonic frequency.

7. A method as recited in claim 6, wherein the feature includes a magnitude.

8. A method as recited in claim 6, wherein the feature includes a phase angle.

9. A method as recited in claim 1, wherein the set of loads are correlated with a reference signal to establish a phase angle.

10. A method as recited in claim 1, further comprising storing the categorical output within a health and usage monitoring system.

11. A method as recited in claim 1, further comprising generating a warning if the categorical output is anything but "No Fault Present."

12. A system for real-time rotor system condition detection comprising:

a sensor system operable to measure a set of loads to obtain measured signals; and a module operable to virtually monitor the set of loads to obtain estimated signals and execute a real-time fault detection and isolation algorithm to subtract the estimated signals from the measured signals to obtain residuals and compare the residuals to a categorical model to identify a categorical output representative of a rotor system condition within the categorical model, wherein the virtual monitoring is accomplished through use of an empirical load model representing a real-time environment.

13. The system as recited in claim 12, further comprising a health and usage monitoring system in communication with said module.

14. The system as recited in claim 12, wherein said module is a portion of a health and usage monitoring system.

* * * * *